United States Patent
Bouguettaya et al.

(10) Patent No.: US 9,540,513 B2
(45) Date of Patent: *Jan. 10, 2017

(54) LIGNOCELLULOSIC ARTICLE AND METHOD OF PRODUCING SAME

(71) Applicant: BASF SE, Ludwigshafen (DE)

(72) Inventors: Mohamed Bouguettaya, Farmington, MI (US); Volker Schaedler, Maikammer (DE); Renee Tarasiewicz, Trenton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,191

(22) Filed: Nov. 20, 2013

(65) Prior Publication Data

US 2014/0142224 A1    May 22, 2014

Related U.S. Application Data

(60) Provisional application No. 61/728,987, filed on Nov. 21, 2012.

(51) Int. Cl.
  *C08L 97/02* (2006.01)
  *D21J 3/12* (2006.01)

(52) U.S. Cl.
  CPC . *C08L 97/02* (2013.01); *D21J 3/12* (2013.01)

(58) Field of Classification Search
  None
  See application file for complete search history.

(56) References Cited

U.S. PATENT DOCUMENTS

| | | | |
|---|---|---|---|
| 4,414,370 A | 11/1983 | Hamielec et al. | |
| 4,529,787 A | 7/1985 | Schmidt et al. | |
| 4,546,160 A | 10/1985 | Brand et al. | |
| 4,618,390 A * | 10/1986 | Powell | 156/307.3 |
| 5,010,166 A | 4/1991 | Schlosky et al. | |
| 5,098,952 A * | 3/1992 | Blasko et al. | 525/123 |
| 5,098,956 A * | 3/1992 | Blasko et al. | 525/123 |
| 5,508,366 A | 4/1996 | Andrist et al. | |
| 5,777,024 A * | 7/1998 | Killilea et al. | 524/590 |
| 5,969,054 A * | 10/1999 | Wamprecht et al. | 525/392 |
| 6,344,165 B1 | 2/2002 | Coleman | |
| 6,632,873 B2 * | 10/2003 | Chen et al. | 524/507 |
| 7,071,248 B2 | 7/2006 | Chen et al. | |
| 2002/0074095 A1 * | 6/2002 | Wierer et al. | 162/10 |
| 2003/0010442 A1 * | 1/2003 | Nowicki et al. | 156/311 |
| 2003/0012883 A1 * | 1/2003 | Yu et al. | 427/393 |
| 2003/0125449 A1 * | 7/2003 | Chen et al. | 524/501 |
| 2003/0215645 A1 * | 11/2003 | Bogner | 428/422.8 |
| 2006/0065996 A1 | 3/2006 | Kruesemann et al. | |
| 2006/0231968 A1 * | 10/2006 | Cowan et al. | 264/109 |
| 2007/0102108 A1 * | 5/2007 | Zheng et al. | 156/272.2 |
| 2011/0171473 A1 * | 7/2011 | Kasmayr et al. | 428/413 |
| 2012/0064355 A1 * | 3/2012 | Kasmayr et al. | 428/511 |
| 2013/0131223 A1 * | 5/2013 | Bouguettaya et al. | 524/35 |
| 2013/0131231 A1 * | 5/2013 | Bouguettaya et al. | 524/72 |

FOREIGN PATENT DOCUMENTS

| | | |
|---|---|---|
| GB | 1 342 229 | 1/1974 |
| JP | H 03-054285 A | 3/1991 |
| JP | H 05-059147 A | 3/1993 |
| WO | WO 96/01293 A1 | 1/1996 |
| WO | WO 96/03461 A1 | 2/1996 |
| WO | WO 03/026878 A1 | 4/2003 |

OTHER PUBLICATIONS

Randall, David et al., "The Polyurethanes Book", John Wiley & Sons, Ltd. 2002, Chapter 26, Wood Adhesives, pp. 395-408.
ASTM International, Designation: D 1037-99, Standard Test Methods for Evaluating Properties of Wood-Based Fiber and Particle Panel Materials, pp. 1-31.
Scicchitano, M. et al., "New Polyisocyanates Containing Perfluoropolyether Macromers for Moisture Curing Applications," Double Liaison—Physique, Chimie & Economie des Pientures & Adhesifs (1998), vol. Date 1997, 44 (500), pp. 28-31.
Temtchenko, T. et al., "Fluropolyethers as Binders for High Performance Automotive Coatings," FATIPEC Congress (2000), 25th(vol. 2), pp. 171-185.
Temtchenko, T. et al., "New Developments in Perfluoropolyether Resins Technology: High Solid and Durable Poliurethanes for Heavy Duty and Clear OEM Coatings", Progress in Organic Coatings (2001), 43(1), pp. 75-84.

* cited by examiner

*Primary Examiner* — Liam J Heincer
(74) *Attorney, Agent, or Firm* — Howard & Howard Attorneys PLLC

(57) ABSTRACT

A lignocellulosic article comprises a plurality of lignocellulosic pieces and a binding agent disposed on the plurality of lignocellulosic pieces. The binding agent is formed from a high temperature polymerization (HTP) polyol and an isocyanate component. A method of producing the lignocellulosic article is also disclosed.

20 Claims, No Drawings

LIGNOCELLULOSIC ARTICLE AND METHOD OF PRODUCING SAME

RELATED APPLICATIONS

This application claims priority to and all the advantages of U.S. Provisional Application No. 61/728,987, which was filed on Nov. 21, 2012, the content of which is incorporated herein by reference.

BACKGROUND OF THE INVENTION

1. Field of the Invention

The subject invention generally relates to a lignocellulosic article and, more particularly, to a lignocellulosic article and a method of producing the lignocellulosic article with a binding agent comprising a high temperature polymerization (HTP) polyol and an isocyanate component.

2. Description of the Related Art

Lignocellulosic articles, such as oriented strand board (OSB), oriented strand lumber (OSL), particleboard (PB), scrimber, agrifiber board, chipboard, flakeboard, and fiberboard, e.g. medium density fiberboard (MDF), generally have desirable physical properties, such as strength and stability. Such lignocellulosic articles are typically produced by blending or spraying lignocellulosic pieces with a binder composition, e.g. a resin. After blending or spraying the lignocellulosic pieces with the binder composition, pressure and heat are applied to the lignocellulosic pieces and the binder composition to form the lignocellulosic articles.

The lignocellulosic pieces can be in the form of chips, shavings, strands, scrim, wafers, fibers, sawdust, bagasse, straw and wood wool. When the lignocellulosic pieces are relatively large in size, e.g. from 1 to 7 inches, the lignocellulosic articles produced by the process are known in the art under the general term of engineered wood. These engineered woods include laminated strand lumber, OSB, OSL, scrimber, parallel strand lumber, and laminated veneer lumber. When the lignocellulosic pieces are relatively small, e.g. typical sawdust and refined fiber sizes, the lignocellulosic articles are known in the art as particleboard and fiberboard, e.g. MDF. Other engineered woods, as scrimber, employ thin, long, irregular pieces of wood having average diameters ranging from about 2 to 10 mm and lengths several feet in length. Regardless of the particular type of lignocellulosic article, binder compositions are typically utilized to bond the lignocellulosic pieces together.

Binder compositions that have been used for making such lignocellulosic articles include phenol formaldehyde (PF) resins, urea formaldehyde (UF) resins and isocyanates. Conventional binder compositions based on isocyanates are commercially desirable because they have low water absorption, high adhesive and cohesive strength, flexibility in formulation, versatility with respect to cure temperature and rate, excellent structural properties, the ability to bond with lignocellulosic materials having high water content and, importantly, zero formaldehyde emissions.

However, conventional binder compositions based on isocyanates require the inclusion of release agents. In particular, when pressure and heat are applied to the lignocellulosic pieces and the binder composition to form the lignocellulosic articles, metal plates are utilized. Isocyanates adhere to the metal plates, which has a deleterious impact on the production of the lignocellulosic articles. For example, if the binder composition adheres to the metal plates, the lignocellulosic articles have undesirable and uneven surfaces. In addition, the metal plates must be scraped and/or cleaned prior to producing another lignocellulosic article. As such, release agents are typically included within the binder composition or applied on the metal plates prior to producing the lignocellulosic articles. Release agents introduce additional costs and processing steps in the method of producing lignocellulosic articles. Moreover, when release agents, which generally comprise soap or wax emulsions, are applied on the metal plates prior to producing the lignocellulosic articles, such release agents pose additional risks, e.g. risks of fire, in view of the elevated temperatures to which the metal plates are heated while producing the lignocellulosic articles.

SUMMARY OF THE INVENTION AND ADVANTAGES

The subject invention provides a lignocellulosic article and a method of producing the lignocellulosic article. The method of producing the lignocellulosic article comprises the steps of providing a plurality of lignocellulosic pieces, providing a high temperature polymerization (HTP) polyol, and providing an isocyanate component. The HTP polyol has the following chemical structure (1):

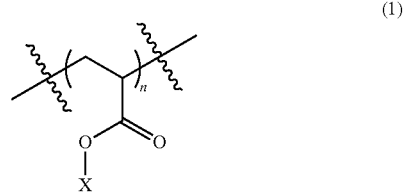

(1)

wherein X is independently selected from a substituted or unsubstituted $C_1$-$C_{30}$ hydrocarbyl group; and n is an integer greater than 1. The method further comprises the step of mixing the HTP polyol and the isocyanate component to form a binding agent. Additionally, the method comprises the step of applying the binding agent to the plurality of lignocellulosic pieces. Finally, the method comprises the step of applying pressure to the plurality of lignocellulosic pieces and the binding agent for a period of time, thereby producing the lignocellulosic article.

The binding agent of the present invention has excellent release properties relative to conventional binding agents, thus reducing and/or eliminating the need for release agents when producing lignocellulosic articles with the binding agent. The binding agent also has excellent binding properties, and thus imparts the lignocellulosic articles with excellent physical properties, such as internal bond (IB) strength.

DETAILED DESCRIPTION OF THE INVENTION

The present invention provides a lignocellulosic article and a method of producing the lignocellulosic article, which are each described in greater detail below. The lignocellulosic article may be utilized in various applications and lignocellulosic products. For example, the lignocellulosic article of the present invention may be utilized in packaging applications, furniture and cabinetry applications, roof and floor sheathing applications, paneling applications, framing applications, and webstock applications, e.g. webstock for engineering I-beams.

The lignocellulosic article, in various embodiments, is generally referred to in the art as various forms of engineered lignocellulosic composites. For example, the lignocellulosic article may be in the form of, and referred to as, engineered wood composites, such as oriented strand board (OSB); oriented strand lumber (OSL); scrimber; fiberboard, such as low density fiberboard (LDF), medium density fiberboard (MDF), and high density fiberboard (HDF); chipboard; flakeboard or flake board; particleboard (PB); plywood; etc. Generally, the lignocellulosic article is in the form OSB, OSL, PB, scrimber, plywood, LDF, MDF, or HDF. However, it is to be appreciated that lignocellulosic article may be in other engineered wood forms, or may be referred to by those of skill in the art as another type of engineering wood composite.

The method of producing the lignocellulosic article comprises the step of providing a plurality of lignocellulosic pieces. For purposes of clarity and brevity, the plurality of lignocellulosic pieces is herein referred to merely as the lignocellulosic pieces. The lignocellulosic pieces can be derived from a variety of lignocellulosic materials. Generally, the lignocellulosic pieces are derived from wood; however, the lignocellulosic pieces can be derived from other lignocellulosic materials, such as from bagasse, straw, flax residue, nut shells, cereal grain hulls, etc., and mixtures thereof. If wood is employed as the lignocellulosic material, the lignocellulosic pieces can be prepared from various species of hardwoods and/or softwoods, as understood in the art. Non-lignocellulosic materials in flake, fibrous or other particulate form, such as glass fiber, mica, asbestos, rubber, plastics, etc., can also be mixed with the lignocellulosic material, although such materials are not generally required for purposes of the present invention.

The lignocellulosic pieces can come from a variety of processes, such as by comminuting small logs, industrial wood residue, branches, rough pulpwood, etc. into pieces in the form of sawdust, chips, flakes, wafer, strands, scrim, fibers, sheets, etc. In certain embodiments, the lignocellulosic pieces comprise those pieces typically employed for producing OSB, OSL, scrimber, and PB. In other embodiments, the lignocellulosic pieces comprise those pieces typically employed for producing fiberboards, such as LDF, MDF, and HDF. In yet another embodiment the lignocellulosic pieces comprise those pieces typically employed for producing plywood. It is to be appreciated that the lignocellulosic article of the present invention can include various combinations of the aforementioned materials and/or pieces, such as strands and sawdust.

As introduced above, the lignocellulosic pieces can be produced by various conventional techniques. For example, pulpwood grade logs can be converted into flakes in one operation with a conventional roundwood flaker. Alternatively, logs and logging residue can be cut into fingerlings on the order of from about 0.5 to about 3.5 inches long with a conventional apparatus, and the fingerlings flaked in a conventional ring type flaker. As understood in the art, the logs are typically debarked before flaking. It is to be appreciated that the present invention is not limited to any particular method of producing the lignocellulosic pieces.

The dimensions of the lignocellulosic pieces are not particularly critical for purposes of the present invention. In certain embodiments, such as those used to form OSB, the lignocellulosic pieces typically comprise strands having an average length of from about 2.5 to about 6 inches, an average width of from about 0.5 to about 2 inches, and an average thickness of from about 0.1 to about 0.5 inches. It is to be appreciated that other sizes can also be employed, as desired by one skilled in the art dependent upon the particular application for which the lignocellulosic article is to be employed. In some of these embodiments, other types of lignocellulosic pieces, such as chips, may be utilized in addition to the strands. In certain embodiments, strands which are typically about 1.5 inches wide and about 12 inches long can be used to make laminated strand lumber, while strands typically about 0.12 inches wide and about 9.8 inches long can be used to make parallel strand lumber. In certain embodiments, such as those used to form flakeboard, the lignocellulosic pieces comprise flakes having an average length of from about 2 to about 6 inches, an average width of about 0.25 to about 3 inches, and an average thickness of from about 0.005 to about 0.05 inches. In other embodiments, such as those used to from scrimber, the lignocellulosic pieces comprise thin, irregular pieces having average diameters ranging from about 0.25 to about 20, more typically from about 0.5 to about 15, and most typically from about 1 to about 10, mm, and lengths ranging from several inches to several feet in length. Detailed information on suitable sizes and shapes of lignocellulosic pieces, e.g., scrim, as well as methods of manufacturing scrimber, for purposes of the present invention, is described in U.S. Pat. No. 6,344,165 to Coleman, the disclosure of which is incorporated herein by reference in its entirety. In yet other embodiments, the lignocellulosic pieces are those typically used to form conventional PB. The lignocellulosic pieces can be further milled prior to use, if such is desired to produce a size more suitable for producing a desired lignocellulosic article. For example, hammer, wing beater, and toothed disk mills may be used for producing lignocellulosic pieces of various sizes and shapes.

The lignocellulosic pieces can have various moisture contents. Typically, the lignocellulosic pieces have a moisture content of from about 1 to about 20, more typically from about 2 to about 15, yet more typically from about 3 to about 12, and most typically from about 5 to about 10, parts by weight (water), based on 100 parts by weight of the lignocellulosic pieces. If present in (or on) the lignocellulosic pieces, the water assists in the curing or setting of the lignocellulosic article, as understood by those skilled in the art. It is to be appreciated that the lignocellulosic pieces can have inherent moisture content or, alternatively, water may be added to or removed from the lignocellulosic pieces, such as by wetting or drying the lignocellulosic pieces, respectively, to obtain a desired moisture content of the lignocellulosic pieces prior to and/or during formation of the lignocellulosic article.

The method of producing the lignocellulosic article further comprises the step of providing a high temperature polymerization (HTP) polyol. The HTP polyol has the following chemical structure (1)

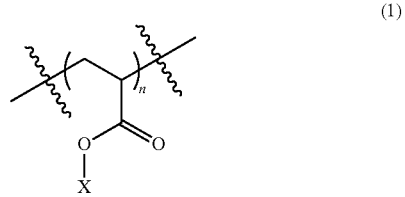

(1)

wherein X is independently selected from a substituted or unsubstituted $C_1$-$C_{30}$ hydrocarbyl group; and n is an integer greater than 1. Subscript n may be any integer greater than 1 depending upon a desired molecular weight of the HTP polyol, e.g. up to 1,000, alternatively up to 10,000. The substituted or unsubstituted hydrocarbyl group may be branched or linear. When substituted, the hydrocarbyl group is typically substituted with hydroxyl functionality, which may be primary or secondary hydroxyl functionality. In certain embodiments, X is independently selected from an ethyl hexyl group, a hydroxyethyl group, a stearyl group, a 2-hydroxypropyl group, and combinations thereof; and n is an integer greater than 1.

The HTP polyol may be that which is described in, for example, U.S. Pat. Nos. 5,508,366, 5,098,952, and/or 5,098,956, which are each incorporated by reference herein in their respective entireties. In addition or alternatively, the HTP polyol may be synthesized via known methods, such as those described in, for example, U.S. Pat. Nos. 4,414,370, 4,529,787, and/or 4,546,160, which are each incorporated by reference herein in their respective entireties.

In certain embodiments, the HTP polyol is formed from reacting various acrylate monomers, with at least one of the monomers including hydroxyl functionality so as to provide the HTP polyol with the hydroxyl functionality. Specific examples of such acrylate monomers that may be utilized to form the HTP polyol include, but are not limited to, 2-ethylhexyl acrylate, hydroxyethyl acetate, stearyl acrylate, and 2-hydroxypropyl acrylate.

The method of producing the lignocellulosic article also comprises the step of providing an isocyanate component. The isocyanate component is typically a polyisocyanate having more than two functional groups, i.e., more than two isocyanate (NCO) groups. Suitable organic polyisocyanates include, but are not limited to, conventional aliphatic, cycloaliphatic, araliphatic and aromatic isocyanates. In certain embodiments, the isocyanate component comprises polymeric diphenylmethane diisocyanate (pMDI). Polymeric diphenylmethane diisocyanates are also referred to in the art as polymethylene polyphenylene polyisocyanates. In certain embodiments, the isocyanate component consists essentially of pMDI. In other embodiments, the isocyanate component consists of pMDI.

The isocyanate component typically has a viscosity which is suitable for specific applications of the isocyanate component to the lignocellulosic pieces, such as by spraying, fogging and/or atomizing the isocyanate component to apply the isocyanate component to the lignocellulosic pieces, as described in greater detail below. Typically, the isocyanate component has a viscosity of from about 100 to about 5,000, more typically from about 100 to about 2,500, and most typically from about 100 to about 1,000, cps at 25° C. according to ASTM D2196. Regardless of the application technique, the viscosity of the isocyanate component should be sufficient to adequately coat the lignocellulosic pieces.

The method of producing the lignocellulosic article additionally comprises the step of mixing the HTP polyol and the isocyanate component to form a binding agent, i.e., the binding agent comprises the reaction product of the HTP polyol and the isocyanate component. The HTP polyol and the isocyanate component are typically mixed to form the binding agent prior to applying the disposing agent on the lignocellulosic pieces, as described below. The HTP polyol and the isocyanate component may be mixed to form the binding agent in any method known in the art, such as by conventional mixing, blending, etc. In certain embodiments, the HTP polyol and the isocyanate component may also be separately metered, mixed and applied to the lignocellulosic pieces such that the step of mixing the HTP polyol and the isocyanate component to form the binding agent occurs while the HTP polyol and the isocyanate component are applied on the lignocellulosic pieces. For example, the HTP polyol and the isocyanate component may be separately sprayed on the lignocellulosic pieces such that the binding agent is formed as the HTP polyol and the isocyanate component are in contact with the lignocellulosic pieces.

The binding agent may comprise the HTP polyol and the isocyanate component individually, or the binding agent may comprise a reaction product of the HTP polyol and the isocyanate component. For example, when mixed, the HTP polyol and the isocyanate component typically at least partially react such that the binding agent comprises a reaction product of the HTP polyol and the isocyanate component. However, the HTP polyol and the isocyanate component are typically not fully reacted and/or cured when initially mixed, and the binding agent typically does not cure until the binding agent is applied on the lignocellulosic pieces and pressure and heat are applied to the binding agent and the lignocellulosic pieces, as described in greater detail below. The binding agent, which includes both the isocyanate component and HTP polyol, bonds, i.e., adheres, the lignocellulosic pieces together. Once cured, the binding agent prevents migration and leaching, as described below.

When mixing the HTP polyol and the isocyanate component to produce the binding agent, the HTP polyol is typically utilized in an amount of from greater than zero to 30, more typically from 5 to 25, most typically from 10 to 20, parts by weight based on 100 parts by weight of the components utilized to form the binding agent prior to reaction.

The isocyanate component is typically utilized in forming the binding agent in an amount of from 70 to less than 100, more typically from 75 to 95, most typically from 80 to 90, parts by weight based on 100 parts by weight of the components utilized to form the binding agent prior to reaction. Typically, the HTP polyol and the isocyanate component are mixed to form the binding agent at room temperature.

In certain embodiments, the binding agent is substantially free from release agents. For example, in conventional lignocellulosic articles, internal and/or external release agents are utilized to prevent the binding agent and/or lignocellulosic pieces from adhering to equipment utilized in forming the conventional lignocellulosic articles, as described in greater detail below. In various embodiments, the binding agent consists essentially of the HTP polyol and the isocyanate component, or the reaction product thereof.

As understood in the art, internal release agents are generally included in conventional binding agents, and mitigate adhesion between the conventional binding agents and metal plates utilized when producing the conventional lignocellulosic articles, as described in greater detail below. In contrast, external release agents are applied on surfaces of the metal plates, and are utilized for the same purpose as internal release agents, i.e., to mitigate adhesion between the binding agent and/or lignocellulosic pieces and the metal plates.

Conventional internal release agents include oils, wax polishes, waxes (e.g. polyethylene wax and/or paraffin wax, or an emulsion thereof), metallic soaps, silicones, and polytetrafluoroethylene. However, the binding agent of the present invention imparts the lignocellulosic article with excellent bond strength and release properties without requiring internal release agents therein. Said differently, the binding agent of the present invention prevents adhesion of the binding agent and/or the lignocellulosic pieces to the equipment utilized in forming the lignocellulosic article, as described in greater detail below, without relying on internal release agents.

It is to be appreciated that the phrase "substantially free," as used herein in reference to the binding agent being substantially free from release agents, means that the binding agent comprises release agents in an amount of less than 10.0, typically less than 5.0, more typically less than 1.0, most typically 0, parts by weight based on 100 parts by weight of the binding agent.

In certain embodiments, the binding agent may further comprise an additive component or mixtures of additive components other than the HTP polyol and the isocyanate component and other than internal release agents. For example, the binding agent may further comprise adhesive components, flame retardants, lignocellulosic preserving agents, fungicides, sizing agents, fillers, extenders, dyes, coupling agents, tackifiers, etc.

Specific examples of additive components that may be utilized in the binding agent of the present invention other than release agents include, but are not limited to, parting agents, sizing agents, catalysts, fillers, flame retardants, water, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, fungicides, insecticides, and combinations thereof. If employed, the additive component may be present in the binding agent in various amounts.

Other suitable additive components that may be utilized in the binding agent of the present invention include those described in U.S. Publication No. 2006/0065996 to Kruesemann et al., the disclosure of which is incorporated herein by reference in its entirety. It is to be appreciated that the additive component may include any combination of the aforementioned additives.

In certain embodiments, the additive component comprises a catalyst component. In one embodiment, the catalyst component comprises a tin catalyst. Suitable tin catalysts, for purposes of the present invention, include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. of Allentown, Pa., under the trade name DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts, for purposes of the present invention, include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trade name POLYCAT®.

Yet further examples of other suitable catalysts, specifically tertiary amine catalysts, for purposes of the present invention, include dimethylaminoethanol, dimethylaminoethoxyethanol, triethylamine, N,N,N',N'-tetramethylethylenediamine, N,N-dimethylaminoprop ylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof. Specific examples of suitable tertiary amine catalysts are commercially available from Air Products and Chemicals, Inc. under the trade name POLYCAT®.

If employed, the catalyst component can be employed in various amounts. It is to be appreciated that the catalyst component may include any combination of the aforementioned catalysts.

The method of producing the lignocellulosic article additionally comprises the step of applying the binding agent to the plurality of lignocellulosic pieces. It is to be appreciated that the phrase "applying the binding agent to the lignocellulosic pieces" encompasses any application in which the binding agent is in contact with the lignocellulosic pieces. For example, the binding agent may be applied on or to the lignocellulosic pieces, or the binding agent may be impregnated with the lignocellulosic pieces, etc. Generally, the step of applying the binding agent to the lignocellulosic pieces comprises disposing the binding agent on the lignocellulosic pieces. It is to be appreciated that the phrase "disposed on" means that the binding agent is in contact with at least a portion of the lignocellulosic pieces. The binding agent generally bonds and adheres the lignocellulosic pieces together to form the lignocellulosic article.

The binding agent can be applied to the lignocellulosic pieces by various methods, such as by mixing, tumbling, rolling, spraying, sheeting, blow-line resination, blending (e.g. blow-line blending), etc.

In certain embodiments, the binding agent is sprayed, atomized, and/or fogged onto the lignocellulosic pieces as the lignocellulosic pieces are being agitated in suitable equipment. In these embodiments, the binding agent is formed from the components on the lignocellulosic pieces. Spraying, atomizing and fogging can occur via use of nozzles, such as one nozzle for each individual component supplied thereto, or nozzles that have two or more components premixed, e.g. the binding agent, and supplied thereto. Alternatively, the components utilized to form the binding agent may be individually or independently applied to the lignocellulosic pieces such that the binding agent is formed on the lignocellulosic pieces. Typically, the binding agent is formed and premixed prior to applying the binding agent to the lignocellulosic pieces.

To maximize coverage of the lignocellulosic pieces, the binding agent is generally applied by spraying droplets or atomizing or fogging particles of the binding agent onto the lignocellulosic pieces as the lignocellulosic pieces are being tumbled in a rotary blender or similar apparatus. As another example, the lignocellulosic pieces can be coated with the binding agent in a rotary drum blender equipped with at least one, typically at least two or three spinning disk atomizers. Tumblers, drums, or rollers including baffles can also be used, as understood in the art. Atomization is useful for maximizing distribution of the components onto the lignocellulosic pieces, based in part on droplet size distribution of the binding agent.

Generally, when the binding agent is applied to the lignocellulosic pieces, the lignocellulosic pieces and the binding agent are referred to as a mass. The mass can be formed into the lignocellulosic article by various methods, such as by disposing the mass onto a carrier, e.g. a conveyor belt. Alternatively, the lignocellulosic article can be formed from the mass directly on the carrier. In other words, the lignocellulosic pieces having the binding agent applied thereto are arranged on the carrier to form the mass. After arrangement, the mass generally has a predetermined width and a predetermined thickness with the lignocellulosic pieces loosely oriented on the carrier. The predetermined width and thickness of the mass are determined according to final widths and thicknesses desired for the lignocellulosic article, as readily understood by one of skill in the art.

The lignocellulosic article can be formed in various shapes, such as boards or panels, or formed into more complex shapes, such as by molding or extruding the mass to form the lignocellulosic article.

As introduced above, alternatively, the lignocellulosic pieces can be provided directly to the carrier, and the binding agent can be applied to the lignocellulosic pieces, e.g. by spraying or sheeting, to form the lignocellulosic article. For example, the lignocellulosic pieces can be disposed on a conveyor belt or a plate, and then sprayed with the binding agent to form the lignocellulosic article.

The amount of the binding agent to be applied and mixed with the lignocellulosic pieces is dependant upon several variables, including the specific components employed, the size, moisture content and type of lignocellulosic pieces used, the intended use of the lignocellulosic article, and the desired properties of the lignocellulosic article.

Typically, such as in OSB, PB, scrimber, or MDF applications, the binding agent is present in an amount of from about 1 to about 20, more typically from about 1 to about 15, and most typically about 2 to about 10, parts by weight, based on 100 parts by weight of the lignocellulosic article based on a on a total solids basis. As used herein, a "total solids basis" generally refers to the amount of solids imparted to the lignocellulosic article, e.g. PB, by the solids present in the binding agent and the dry weight of the lignocellulosic pieces.

The lignocellulosic pieces are present in the lignocellulosic article in various amounts, depending on the type of lignocellulosic article. Typically, such as in OSB, PB, scrimber, or MDF applications, the lignocellulosic pieces are present in an amount of from about 75 to about 99, more typically from about 85 to about 98, yet more typically from about 90 to about 97, and most typically about 92 to about 95.5, parts by weight, based on 100 parts by weight of the lignocellulosic article. It is to be appreciated that the amounts described immediately above can be higher or lower depending on various factors, including moisture content.

The method of producing the lignocellulosic article further comprises the step of applying pressure to the plurality of lignocellulosic pieces and the binding agent for a period of time, thereby producing the lignocellulosic article.

The pressure may be applied to the plurality of lignocellulosic pieces and the binding agent by methods known in the art. In certain embodiments, the pressure is applied via pressing the plurality of lignocellulosic pieces and the binding agent with at least one metal plate. The at least one metal plate typically comprises aluminum, although the at least one metal plate may comprise other metals, such as stainless steel, carbon steel, etc. When the pressure is applied via one metal plate, an opposing substrate is generally present opposite and substantially parallel to the metal plate such that the lignocellulosic pieces and the binding agent are sandwiched between the opposing substrate and the metal plate during the step of applying pressure to the plurality of lignocellulosic pieces and the binding agent. Typically, the pressure is applied via two metal plates, which are substantially parallel to and opposite one another. In these embodiments, the two metal plates sandwich the lignocellulosic pieces and the binding agent therebetween. The two metal plates may comprise the same metal, e.g. aluminum, or may independently comprise different types of metals, e.g. aluminum and stainless steel.

The at least one metal plate is typically substantially free from release agents. For example, as described above, conventional lignocellulosic articles are typically produced with the aid of external release agents, which are applied on surfaces of the at least one metal plate. Such release agents are utilized for mitigating adhesion between the binding agent and/or lignocellulosic pieces and the at least one metal plate. Conventional release agents include oils, wax polishes, metallic soaps, silicones and polytetrafluoroethylene. However, the binding agent of the present invention imparts the lignocellulosic article with excellent bond strength and release properties without requiring release agents on the at least one metal plate. Similarly, when the step of applying pressure to the lignocellulosic pieces and the binding agent comprises applying pressure via two metal plates, the two metal plates are typically substantially free from release agents. Further, when the opposing substrate is other than a metal plate, the opposing substrate is typically substantially free from release agents. It is to be appreciated that the phrase "substantially free," as used herein in reference to the at least one metal plate being substantially free from external release agents, means that external release agents are utilized in an amount of no more than 5, alternatively no more than 3, alternatively no more than 1, percent by weight based on the total weight of the lignocellulosic pieces utilized to form the lignocellulosic article.

The step of applying pressure to the lignocellulosic piece and the binding agent may be carried out as a batch, semi-batch, or continuous process.

The step of applying pressure to the plurality of lignocellulosic pieces and the binding agent typically comprises applying pressure in an amount of from greater than 0 to 6000, alternatively from 50 to 500, psi. The pressure may vary or may be constant. The pressure is typically applied to the lignocellulosic pieces and the binding agent for a period of time of from 60 to 300, more typically from 110 to 250, most typically from 120 to 240 seconds. This period of time is often referred to in the art as the "press time." In embodiments in which the pressure is applied to the lignocellulosic pieces and the binding agent for the press time immediately above, the pressure is typically applied at a temperature of from 90 to 250, more typically from 110 to 230, most typically from 120 to 220° C. It is to be appreciated that the pressure, press time, and temperature at which the pressure is applied may vary from the ranges set forth above depending on several variables, such as the type and size of the lignocellulosic pieces, the moisture content of the lignocellulosic pieces, the desired dimensions of the lignocellulosic article, etc.

The press time employed should be of sufficient duration to at least substantially cure the binding agent and to provide a lignocellulosic article of the desired shape, dimension and strength. As readily understood in the art, during the step of applying pressure to the plurality of lignocellulosic pieces and the binding agent, the (HTP) polyol and the isocyanate component react and cure to form urethane linkages. The binding agent, once cured, imparts the lignocellulosic article with excellent physical properties, as described below. In addition, the binding agent, once cured, substantially prevents migration and leaching to and/or from the lignocellulosic article.

The lignocellulosic article may be of various sizes, shapes, and thicknesses. For example, the lignocellulosic article of the present invention may be configured to mimic conventional lignocellulosic articles, such as OSB, PB, scrimber, and MDF beams, boards, or panels. The lignocellulosic article can also be of various complex shapes, such as moldings, fascias, furniture, etc. As described above, in certain embodiments, the lignocellulosic article is fiberboard, e.g. MDF. In other embodiments, the lignocellulosic article is OSB, scrimber, or OSL. In yet other embodiments, the lignocellulosic article is PB. The lignocellulosic article can comprise one or more layers. For example, if the lignocellulosic article is OSB, the lignocellulosic article can comprise one layer, e.g. a core layer, two layers, e.g. a core layer and a face/fascia layer, or three or more layers, e.g. a core layer and two fascia layers, as understood by those skilled in the art.

In certain embodiments, such as for OSB applications, the lignocellulosic article has a first fascia layer comprising a first portion of the plurality of lignocellulosic pieces compressed together and substantially oriented in a first direction. The lignocellulosic article further has a second fascia layer spaced from and parallel to the first fascia layer and comprising a second portion of the plurality of lignocellulosic pieces compressed together and substantially oriented in the first direction. The lignocellulosic article yet further has a core layer disposed between the first and second fascia layers and comprising a remaining portion of the plurality of lignocellulosic pieces compressed together and substantially oriented in a second direction different than the first direction. In these embodiments, at least one of the portions of the plurality of lignocellulosic pieces is compressed together with the binder composition of present invention, as described and exemplified above. For example, the core layer can comprise the binding agent in cured form. The fascia layers can also include the binding agent in cured form in addition to, or alternate to, the core layer. The layers can each comprises different binding agents, depending on the specific components employed in the respective binder agents of the layers. In certain embodiments, at least one of the layers, e.g. one or both of the fascia layers, can further comprise a phenol formaldehyde (PF) resin, as understood in the art. Each of the layers can be of various thicknesses, such as those encountered with conventional OSB layers. Those skilled in the art appreciate that OSL typically has lignocellulosic pieces substantially orientated in only one direction. Other types of lignocellulosic articles, e.g. wood composites, and their methods of manufacture, that can be formed for purposes of the present invention, are described by pages 395 through 408 of THE POLYURETHANES HANDBOOK (David Randall & Steve Lee eds., John Wiley & Sons, Ltd. 2002), which is incorporated herein by reference in its entirety.

The lignocellulosic article has an original thickness, i.e., a thickness after manufacture, e.g. after applying pressure to the lignocellulosic pieces and the binding agent to form the lignocellulosic article. Typically, due to the binding agent of the present invention, the lignocellulosic product exhibits a swelling of less than about 25%, typically less than about 20%, more typically less than about 10%, and most typically less than about 3%, based on a 24-hour cold-soak test according to ASTM D1037. The thickness can vary, but is typically from about 0.25 to about 10, more typically from about 0.25 to about 5, and most typically from about 0.25 to about 1.5, inches. It is to be appreciated that describing thicknesses may not be suitable when describing complex shapes other than boards or panels. As such, the lignocellulosic article can be of various dimensions based on final configuration of the lignocellulosic article.

The (HTP) polyol of the binding agent of the present invention has excellent bonding properties. As such, the lignocellulosic article has an internal bond (IB) strength typically greater than about 40, more typically greater than about 50, and most typically greater than about 60, pounds per square inch (psi), as measured in accordance with ASTM D1037. In certain embodiments, the lignocellulosic article typically has an IB strength of from about 40 to about 300, more typically from about 60 to about 300, and most typically from about 80 to about 300, psi, as measured in accordance with ASTM D1037.

The method of the instant invention produces lignocellulosic articles having excellent physical properties without the need of conventional release agents, which decreases costs and production time associated with the production of such lignocellulosic articles. Further, the lignocellulosic articles produced via the method have excellent moisture resistance, even compared to conventional lignocellulosic articles formed with release agents.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Various high temperature polymerization (HTP) polyols suitable for the subject method are prepared.

Preparation Examples 1-6

In particular, the components utilized to form HTP Polyols 1-6 are set forth below in Table 1. The values in Table 1 are in parts by weight based on the total weight of the components utilized in each of Preparation Examples 1-6.

TABLE 1

| Starting Components | Preparation Example | | | | | |
|---|---|---|---|---|---|---|
|  | 1 | 2 | 3 | 4 | 5 | 6 |
| Acrylate monomer 1 | 60.7 | 40.5 | 20.2 | 74.5 | 74.5 | 60.7 |
| Acrylate monomer 2 | 30.3 | 30.3 | 30.3 | 16.5 | 0 | 0 |
| Acrylate monomer 3 | 0 | 20.2 | 40.5 | 0 | 0 | 0 |
| Acrylate monomer 4 | 0 | 0 | 0 | 0 | 16.5 | 30.3 |
| Isopropanol | 8 | 8 | 8 | 8 | 8 | 8 |
| Di-tert-amyl peroxide | 1 | 1 | 1 | 1 | 1 | 1 |
| total: | 100 | 100 | 100 | 100 | 100 | 100 |

Acrylate monomer 1 is 2-ethylhexyl acrylate.
Acrylate monomer 2 is hydroxyl ethyl acrylate.
Acrylate monomer 3 is stearyl acrylate.
Acrylate monomer 4 is 2-hydroxypropyl acrylate.

The conditions of the CSTR for each of Preparation Examples 1-6 are set forth below in Table 2.

TABLE 2

| Condition: | Preparation Example | | | | | |
|---|---|---|---|---|---|---|
|  | 1 | 2 | 3 | 4 | 5 | 6 |
| CSTR feed (mL/min) | 6.7 | 6.7 | 6.7 | 6.7 | 6.7 | 6.7 |
| CSTR temperature (° C.) | 220 | 220 | 220 | 165 | 165 | 220 |
| Hot finger temperature (° C.) | 220 | 220 | 220 | 220 | 220 | 220 |
| Vapor line temperature (° C.) | 220 | 220 | 220 | 220 | 220 | 220 |

Various physical properties of HTP Polyols 1-6 are measured following their preparation in Preparation Examples 1-6 and are set forth below in Table 3.

TABLE 3

| Property | HTP Polyol | | | | | |
|---|---|---|---|---|---|---|
|  | 1 | 2 | 3 | 4 | 5 | 6 |
| Non-volatile content (mass %) | 98.2 | 98.3 | 98.3 | 98.6 | 98.6 | 98.1 |
| Mn | 2,097 | 2,497 | 2,849 | 2,978 | 2,856 | 1,968 |
| Mw | 5,389 | 7,974 | 11,906 | 7,801 | 6,917 | 4,629 |
| Mw/Mn | 2.6329 | 3.1939 | 4.1797 | 2.6199 | 2.4219 | 2.352 |
| OH # (mg KOH/g) | 159.0 | 147.7 | 142.2 | 84.0 | 72.0 | 122.8 |

PRACTICAL AND COMPARATIVE EXAMPLES

Lignocellulosic articles are prepared in accordance with the subject method. The lignocellulosic articles have target dimensions of 16×16×0.5 inches. The lignocellulosic articles have a target density of 45 pounds/inch$^2$. The lignocellulosic articles of the Practical and Comparative Examples comprise particleboard. Any of HTP Polyols 1-6 may be utilized to prepare the binding agent of the method. Practical Examples 1 and 2 below utilize HTP Polyol 5. Comparative Examples 1 and 2 below utilize a binding agent that is not formed from an HTP Polyol.

Practical Examples 1 and 2

In particular, Binding Agents 1 and 2 are each formed by combining polymethylene polyphenylpolyisocyanate (pMDI) and HTP Polyol 5. More specifically, Table 4 below sets forth the relative amounts of the pMDI and HTP Polyol 5 utilized in Binding Agents 1 and 2. Binding Agent 1 is utilized in Practical Example 1 and Binding Agent 2 is utilized in Practical Example 2. The weight percents below in Table 4 relate to the weight percent of either the pMDI or HTP Polyol 5, respectively, based on the total weight of the dry wood utilized in forming the lignocellulosic articles of Practical Examples 1 and 2, respectively.

TABLE 4

| Component | Example | |
|---|---|---|
|  | Practical Example 1 | Practical Example 2 |
| pMDI | 3 wt % | 3 wt % |
| HTP Polyol 5 | 0.3 wt % | 0.1 wt % |

Comparative Examples 1 and 2

Comparative Example 1 utilizes a control binding agent. The control binding agent comprises pMDI only. Comparative Example 2 utilizes 0.45 weight percent of a commercial binding agent based on the total weight of the dry wood utilized in forming the lignocellulosic article of Comparative Example 2 and the same amount of pMDI as in Practical Examples 1 and 2. The commercial binding agent of Comparative Example 2 is INT-1948MCH (Mold Wiz), which is commercially available from Axel Plastics Research Laboratories, Inc. of Woodside, N.Y.

The binding agents of Practical Examples 1 and 2 and Comparative Examples 1 and 2 are sprayed on a plurality of lignocellulosic pieces (particle board). The lignocellulosic pieces and binding agents are each pressed between stainless steel plates for 180 seconds at 170° C. to form lignocellulosic articles. Prior to use, the stainless steel plates are scraped and cleaned with acetone to remove any residual release agents from prior use.

Numerous trials were carried out for each of Practical Examples 1 and 2 and Comparative Examples 1 and 2. Internal bond strength from each trial is measured in accordance with ASTM D1037. The internal bond strengths for each lignocellulosic article of each trial are set forth below in Table 5.

TABLE 5

| Example | Binding Agent | Panel | Trial | Weight (lbs.) | Thickness (inches) | Avg. Density (lbs/inches$^2$) | Internal Bond (IB) Strength (psi) | Average IB Strength (psi) |
|---|---|---|---|---|---|---|---|---|
| Comparative Example 1 | Control | 1 | 1 | 21.25 | 0.4493 | 45.00 | 252.64 | 240.14 |
| | Control | 1 | 2 | 21.71 | 0.4479 | 46.12 | 262.78 | |
| | Control | 1 | 3 | 21.11 | 0.4472 | 44.92 | 243.13 | |
| | Control | 1 | 4 | 19.44 | 0.4459 | 41.48 | 214.71 | |
| | Control | 1 | 5 | 20.34 | 0.4543 | 42.60 | 228.64 | |
| | Control | 1 | 6 | 20.61 | 0.4534 | 43.25 | 258.60 | |
| | Control | 1 | 7 | 20.13 | 0.4486 | 42.70 | 247.08 | |
| | Control | 1 | 8 | 19.52 | 0.4477 | 41.49 | 213.58 | |
| | Control | 2 | 1 | 21.43 | 0.4567 | 44.65 | 253.52 | 202.09 |
| | Control | 2 | 2 | 21.41 | 0.4536 | 44.91 | 190.30 | |
| | Control | 2 | 3 | 21.16 | 0.4518 | 44.57 | 218.17 | |
| | Control | 2 | 4 | 20.15 | 0.4488 | 42.72 | 190.14 | |
| | Control | 2 | 5 | 21.30 | 0.4531 | 44.73 | 208.02 | |
| | Control | 2 | 6 | 21.00 | 0.4496 | 44.44 | 196.67 | |
| | Control | 2 | 7 | 20.26 | 0.4469 | 43.14 | 189.90 | |
| | Control | 2 | 8 | 18.73 | 0.4479 | 39.79 | 170.01 | |
| | Control | 3 | 1 | 20.10 | 0.4489 | 42.61 | 183.94 | 217.06 |
| | Control | 3 | 2 | 20.53 | 0.4510 | 43.32 | 234.68 | |
| | Control | 3 | 3 | 21.07 | 0.4529 | 44.27 | 220.42 | |
| | Control | 3 | 4 | 21.77 | 0.4524 | 45.79 | 216.72 | |
| | Control | 3 | 5 | 20.07 | 0.4503 | 42.41 | 213.01 | |
| | Control | 3 | 6 | 19.89 | 0.4532 | 41.76 | 196.26 | |
| | Control | 3 | 7 | 20.25 | 0.4570 | 42.16 | 244.10 | |
| | Control | 3 | 8 | 20.78 | 0.4534 | 43.61 | 227.35 | |
| Comparative Example 2 | Commercial | 1 | 1 | 18.63 | 0.4583 | 38.68 | 153.58 | 159.47 |
| | Commercial | 1 | 2 | 18.82 | 0.4509 | 39.72 | 162.68 | |
| | Commercial | 1 | 3 | 19.80 | 0.4534 | 41.55 | 144.88 | |
| | Commercial | 1 | 4 | 20.89 | 0.4630 | 42.93 | 183.70 | |
| | Commercial | 1 | 5 | 19.35 | 0.4519 | 40.74 | 190.79 | |
| | Commercial | 1 | 6 | 18.66 | 0.4534 | 39.16 | 138.92 | |
| | Commercial | 1 | 7 | 19.39 | 0.4547 | 40.58 | 133.24 | |
| | Commercial | 1 | 8 | 20.60 | 0.4569 | 42.90 | 167.99 | |
| | Commercial | 2 | 1 | 19.61 | 0.4526 | 41.23 | 171.06 | 180.02 |
| | Commercial | 2 | 2 | 19.79 | 0.4479 | 42.04 | 160.42 | |
| | Commercial | 2 | 3 | 19.86 | 0.4491 | 42.08 | 173.95 | |
| | Commercial | 2 | 4 | 20.20 | 0.4482 | 42.89 | 202.87 | |
| | Commercial | 2 | 5 | 19.43 | 0.4675 | 39.55 | 180.56 | |
| | Commercial | 2 | 6 | 19.56 | 0.4533 | 41.06 | 169.61 | |
| | Commercial | 2 | 7 | 20.29 | 0.4557 | 42.37 | 186.61 | |
| | Commercial | 2 | 8 | 20.59 | 0.4585 | 42.73 | 195.05 | |
| | Commercial | 3 | 1 | 19.89 | 0.4538 | 41.71 | 166.30 | 161.17 |
| | Commercial | 3 | 2 | 18.94 | 0.4445 | 40.54 | 159.94 | |
| | Commercial | 3 | 3 | 19.10 | 0.4459 | 40.76 | 170.09 | |
| | Commercial | 3 | 4 | 19.65 | 0.4472 | 41.81 | 148.10 | |
| | Commercial | 3 | 5 | 19.83 | 0.4552 | 41.45 | 159.22 | |
| | Commercial | 3 | 6 | 19.35 | 0.4484 | 41.06 | 158.81 | |
| | Commercial | 3 | 7 | 18.78 | 0.4478 | 39.91 | 161.63 | |
| | Commercial | 3 | 8 | 19.82 | 0.4581 | 41.17 | 165.26 | |
| Practical Example 1 | 1 | 1 | 1 | 19.86 | 0.4509 | 41.91 | 185.47 | 190.85 |
| | 1 | 1 | 2 | 20.04 | 0.4541 | 41.99 | 174.28 | |
| | 1 | 1 | 3 | 20.39 | 0.4470 | 43.40 | 206.57 | |
| | 1 | 1 | 4 | 19.56 | 0.4487 | 41.48 | 163.49 | |
| | 1 | 1 | 5 | 20.65 | 0.4510 | 43.57 | 191.11 | |
| | 1 | 1 | 6 | 20.42 | 0.4500 | 43.18 | 227.51 | |
| | 1 | 1 | 7 | 19.23 | 0.4532 | 40.38 | 198.52 | |
| | 1 | 1 | 8 | 19.83 | 0.4662 | 40.47 | 179.83 | |
| | 1 | 2 | 1 | 20.33 | 0.4503 | 42.96 | 213.17 | 220.30 |
| | 1 | 2 | 2 | 19.92 | 0.4438 | 42.71 | 184.34 | |
| | 1 | 2 | 3 | 19.57 | 0.4481 | 41.56 | 164.29 | |
| | 1 | 2 | 4 | 18.91 | 0.4442 | 40.51 | 186.12 | |
| | 1 | 2 | 5 | 20.54 | 0.4543 | 43.02 | 235.40 | |
| | 1 | 2 | 6 | 20.75 | 0.4475 | 44.12 | 262.86 | |
| | 1 | 2 | 7 | 20.97 | 0.4464 | 44.70 | 241.44 | |
| | 1 | 2 | 8 | 20.89 | 0.4513 | 44.05 | 274.78 | |
| | 1 | 3 | 1 | 21.40 | 0.4484 | 45.41 | 231.46 | 221.40 |
| | 1 | 3 | 2 | 20.72 | 0.4517 | 43.65 | 242.57 | |
| | 1 | 3 | 3 | 20.98 | 0.4485 | 44.51 | 212.53 | |
| | 1 | 3 | 4 | 20.16 | 0.4454 | 43.07 | 241.28 | |
| | 1 | 3 | 5 | 20.08 | 0.4404 | 43.39 | 174.76 | |

TABLE 5-continued

| Example | Binding Agent | Panel | Trial | Weight (lbs.) | Thickness (inches) | Avg. Density (lbs/inches²) | Internal Bond (IB) Strength (psi) | Average IB Strength (psi) |
|---|---|---|---|---|---|---|---|---|
| | 1 | 3 | 6 | 20.50 | 0.4424 | 44.09 | 237.49 | |
| | 1 | 3 | 7 | 20.68 | 0.4437 | 44.35 | 189.50 | |
| | 1 | 3 | 8 | 21.04 | 0.4470 | 44.79 | 241.60 | |
| Practical Example 2 | 2 | 1 | 1 | 20.30 | 0.4552 | 42.43 | 274.38 | 225.17 |
| | 2 | 1 | 2 | 20.48 | 0.4566 | 42.68 | 192.16 | |
| | 2 | 1 | 3 | 19.35 | 0.4527 | 40.67 | 208.75 | |
| | 2 | 1 | 4 | 18.83 | 0.4520 | 39.64 | 196.34 | |
| | 2 | 1 | 5 | 20.32 | 0.4487 | 43.09 | 249.01 | |
| | 2 | 1 | 6 | 19.92 | 0.4481 | 42.30 | 230.41 | |
| | 2 | 1 | 7 | 18.69 | 0.4457 | 39.90 | n/a | |
| | 2 | 1 | 1 | 18.51 | 0.4519 | 38.98 | 191.35 | 197.50 |
| | 2 | 2 | 2 | 19.06 | 0.4473 | 40.55 | 192.48 | |
| | 2 | 2 | 3 | 19.68 | 0.4522 | 41.41 | 226.30 | |
| | 2 | 2 | 4 | 19.84 | 0.4523 | 41.74 | 230.41 | |
| | 2 | 2 | 5 | 17.85 | 0.4383 | 38.75 | 168.80 | |
| | 2 | 2 | 6 | 18.07 | 0.4404 | 39.04 | 171.06 | |
| | 2 | 2 | 7 | 18.46 | 0.4386 | 40.05 | 184.42 | |
| | 2 | 2 | 8 | 18.97 | 0.4393 | 41.09 | 215.19 | |
| | 2 | 2 | 1 | 19.60 | 0.4431 | 42.09 | 255.70 | 219.54 |
| | 2 | 3 | 2 | 19.96 | 0.4392 | 43.24 | 239.43 | |
| | 2 | 3 | 3 | 18.80 | 0.4393 | 40.72 | 185.79 | |
| | 2 | 3 | 4 | 18.41 | 0.4388 | 39.92 | 199.00 | |
| | 2 | 3 | 5 | 20.64 | 0.4500 | 43.64 | 203.67 | |
| | 2 | 3 | 6 | 21.03 | 0.4538 | 44.10 | 223.48 | |
| | 2 | 3 | 7 | 20.35 | 0.4536 | 42.69 | 221.31 | |
| | 2 | 3 | 8 | 19.63 | 0.4558 | 40.98 | 227.91 | |

As clearly illustrated above in Table 5, Binding Agents 1 and 2 provided a significantly improved IB strength in the resulting lignocellulosic articles as compared to the lignocellulosic article of Comparative Example 2, which is representative of a commercially available binding agent/mold release agent. Moreover, although Comparative Example 1 provided desirable IB strength, the lignocellulosic articles formed in Comparative Example 1 did not easily separate from the stainless steel plates, and a significant portion of the lignocellulosic pieces remained adhered to the stainless steel plates in Comparative Example 1, which was not the case for Practical Examples 1 and 2.

For example, during each trial for each lignocellulosic article, adhesion of the lignocellulosic pieces to the stainless steel plates (i.e., panels) increases with conventional methods unless additional amounts of release agents are utilized in between trials. To this end, Practical Examples 1 and 2 had excellent release free from residual fibers adhering to the plates (i.e., panels) during all eight consecutive trials. In contrast, for Comparative Examples 1 (i.e., the control), a number of lignocellulosic fibers adhered to the panel even after the first trial, which became increasingly undesirable with each trial. For example, by trial 8 of Comparative Example 1, the entirety of the panel included lignocellulosic fibers adhered thereto, and the lignocellulosic article was required to be manually pried from the panels. Lignocellulosic fibers began adhering to the panels in Comparative Example 2 around the fifth trial. As such, Practical Examples 1 and 2 provide greater mold release than Comparative Example 2 while utilizing a lesser amount of the respective binding agent.

Additional physical properties of lignocellulosic articles formed in Practical Examples 1 and 2 and Comparative Examples 1 and 2 are measured. In particular, Table 6 below illustrates the average modulus of elasticity (MOE) and modulus of rupture (MOR) for these lignocellulosic articles. MOE and MOR are measured in accordance with ASTM D1037, entitled "Standard Test Methods for Evaluating Properties of Wood-Base Fiber and Particle Panel Materials." Numerous trials were conducted and averaged for the values in Table 6.

TABLE 6

| Example | Binding Agent | Panel | Average Weight (lbs.) | Average thickness (inches) | Average Density (lbs/inches²) | Average Volume (ft³) | Average MOE (psi) | Average MOR (psi) |
|---|---|---|---|---|---|---|---|---|
| Comparative Example 1 | Control | 1 | 223.79 | 0.4730 | 42.8749 | 0.0115 | 312,003 | 1,997 |
| | Control | 2 | 230.53 | 0.4700 | 44.4465 | 0.0114 | 355,695 | 2,462 |
| | Control | 3 | 215.06 | 0.4664 | 43.6607 | 0.0113 | 217,524 | 1,514 |
| Comparative Example 1 | Commercial | 1 | 208.39 | 0.4688 | 40.2864 | 0.0114 | 226,092 | 1,541 |
| | Commercial | 2 | 207.54 | 0.4705 | 39.9785 | 0.0114 | 194,823 | 1,182 |
| | Commercial | 3 | 210.35 | 0.4756 | 40.1325 | 0.0116 | 259,379 | 1,444 |
| Practical Example 1 | 1 | 1 | 211.37 | 0.4655 | 41.1508 | 0.0113 | 279,685 | 1,793 |
| | 1 | 2 | 203.61 | 0.4724 | 39.0624 | 0.0115 | 168,985 | 1,165 |
| | 1 | 3 | 219.93 | 0.4603 | 40.1066 | 0.0112 | 247,541 | 1,877 |
| Practical Example 2 | 2 | 1 | 218 | 0.4669 | 42.3158 | 0.0113 | 280,552 | 1,793 |
| | 2 | 2 | 199.94 | 0.4648 | 38.9855 | 0.0113 | 211,186 | 1,271 |
| | 2 | 3 | 222.04 | 0.4700 | 40.6506 | 0.0114 | 304,631 | 2,134 |

Further physical properties of lignocellulosic articles formed in Practical Examples 1 and 2 and Comparative Examples 1 and 2 are measured. In particular, Table 7 below illustrates the average edge swell percentage, the average 1" swell percentage, and the weight gain percentage for various trials of Practical Examples 1 and 2 and Comparative Examples 1 and 2. For the average edge swell and average 1" swell, the values at all four edges of each lignocellulosic article are measured and averaged to obtain the particular value set forth in Table 7 below. The physical properties set forth in Table 7 are measured in accordance with ASTM D1037.

TABLE 7

| Example | Binding Agent | Panel Number | Trial Number | Average Edge Swell (%) | Average 1" Swell (%) | Weight Gain (%) |
|---|---|---|---|---|---|---|
| Comparative Example 1 | Control | 1 | 1 | 16.9562 | 17.5263 | 41.1015 |
| | Control | 1 | 2 | 16.2023 | 15.2846 | 37.8907 |
| | Control | 2 | 1 | 17.0990 | 17.2716 | 42.1992 |
| | Control | 2 | 2 | 18.0861 | 17.6850 | 37.4047 |
| | Control | 3 | 1 | 19.3472 | 16.6097 | 32.9312 |
| | Control | 3 | 2 | 15.5058 | 13.8473 | 41.6002 |
| Comparative Example 2 | Commercial | 1 | 1 | 22.4410 | 23.6946 | 94.8845 |
| | Commercial | 1 | 2 | 23.1170 | 21.6447 | 93.1631 |
| | Commercial | 2 | 1 | 19.5708 | 22.2371 | 96.1496 |
| | Commercial | 2 | 2 | 20.1416 | 20.8164 | 93.7091 |
| | Commercial | 3 | 1 | 19.9165 | 20.0483 | 102.3905 |
| | Commercial | 3 | 2 | 18.6278 | 17.7629 | 97.8221 |
| Practical Example 1 | 1 | 1 | 1 | 18.1282 | 16.9727 | 32.4769 |
| | 1 | 1 | 2 | 17.1548 | 15.1469 | 31.4578 |
| | 1 | 2 | 1 | 14.7619 | 13.3405 | 25.4776 |
| | 1 | 2 | 2 | 13.7104 | 11.8855 | 26.9935 |
| | 1 | 3 | 1 | 14.0556 | 13.2209 | 30.5076 |
| | 1 | 3 | 2 | 17.8912 | 18.2047 | 34.8557 |
| Practical Exampel 2 | 2 | 1 | 1 | 14.0879 | 14.8819 | 39.8976 |
| | 2 | 1 | 2 | 17.4679 | 14.7857 | 33.3852 |
| | 2 | 2 | 1 | 16.9992 | 15.1239 | 30.9672 |
| | 2 | 2 | 2 | 16.3800 | 14.6050 | 26.3057 |
| | 2 | 3 | 1 | 18.4390 | 16.2957 | 38.3638 |
| | 2 | 3 | 2 | 16.9570 | 16.9497 | 37.5824 |

As illustrated above, there is significantly less weight gain associated with the Binding Agent of Practical Examples 1 and 2 than the commercial binding agent of Comparative Example 2. Similarly, there is lesser edge swelling.

As clearly illustrated throughout these Examples, the subject method provides lignocellulosic having improved physical properties while obviating the need for mold release agents. Moreover, these improved physical properties can be obtained while achieving greater separation and less adhesion to the panels when forming these lignocellulosic articles. In fact, such improvements are achieved at lower concentrations than those utilized as the commercial binding agent of Comparative Example 2.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:
1. A method of producing a lignocellulosic article, said method comprising the steps of:
   providing a plurality of lignocellulosic pieces;
   providing a high temperature polymerization (HTP) polyol having an ultimate glass transition temperature of from −44° C. to −5° C.;
   providing an isocyanate component;
   mixing the HTP polyol and the isocyanate component to form a binding agent;
   applying the binding agent to the plurality of lignocellulosic pieces; and
   applying pressure to the plurality of lignocellulosic pieces and the binding agent for a period of time, thereby producing the lignocellulosic article;
   wherein the HTP polyol has the following chemical structure (1)

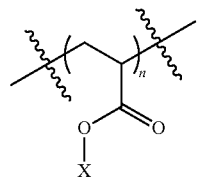

(1)

wherein X is independently selected from a substituted or unsubstituted $C_1$-$C_{30}$ hydrocarbyl group; and n is an integer greater than 1,
   wherein the step of mixing the HTP polyol and the isocyanate component comprises mixing the isocyanate component in an amount of from about 85 to less than 100 parts by weight based on 100 parts by weight of the components utilized to form the binding agent prior to reaction.
2. A method as set forth in claim 1 wherein the binding agent is substantially free of release agents.
3. A method as set forth in claim 1 wherein the step of applying pressure to the plurality of lignocellulosic pieces and the binding agent comprises pressing the plurality of lignocellulosic pieces and the binding agent with at least one metal plate.
4. A method as set forth in claim 3 wherein the at least one metal plate is substantially free of release agents.

5. A method as set forth in claim 1 wherein the step of applying pressure to the plurality of lignocellulosic pieces and the binding agent comprises applying pressure in an amount of from 50 to 500 psi.

6. A method as set forth in claim 1 wherein the step of mixing the HTP polyol and the isocyanate component- comprises mixing the HTP polyol in an amount of from greater than zero to about 15 parts by weight based on 100 parts by weight of the components utilized to form the binding agent prior to reaction.

7. A method as set forth in claim 1 wherein the plurality of lignocellulosic pieces are present in the lignocellulosic article in an amount of from about 75 to about 99 parts by weight based on 100 parts by weight of the lignocellulosic article.

8. A method as set forth in claim 1 wherein the isocyanate component comprises polymethylene polyphenylpolyisocyanate (pMDI).

9. A method as set forth in claim 1 wherein the step of applying pressure to the plurality of lignocellulosic pieces and the binding agent comprises applying pressure for a period of time of from 120 to 240 seconds.

10. A method as set forth in claim 9 wherein the step of applying pressure to the plurality of lignocellulosic pieces and the binding agent comprises applying pressure at a temperature of from 120 to 220 ° C.

11. A method as set forth in claim 1 wherein X is selected from an ethyl hexyl group, a hydroxyethyl group, a stearyl group, a 2-hydroxypropyl group, and combinations thereof.

12. A lignocellulosic article comprising:
a plurality of lignocellulosic pieces; and
a binding agent disposed on and binding said plurality of lignocellulosic pieces;
wherein said binding agent comprises the reaction product of a high temperature polymerization (HTP) polyol and an isocyanate component, wherein said binding agent comprises said isocyanate component in an amount of from about 85 to less than 100 parts by weight based on 100 parts by weight of the components utilized to form said binding agent prior to reaction;
wherein said HTP polyol has an ultimate glass transition temperature of from −44° C. to −5° C. and is according to the following chemical structure (1)

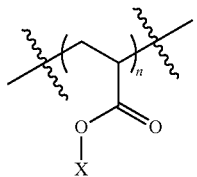
(1)

wherein X is independently selected from a substituted or unsubstituted $C_1$-$C_{30}$ hydrocarbyl group; and n is an integer greater than 1.

13. A lignocellulosic article as set forth in claim 12 wherein said binding agent is substantially free of release agents.

14. A lignocellulosic article as set forth in claim 12 wherein said binding agent comprises said HTP polyol in an amount of from greater than zero to about 15 parts by weight based on 100 parts by weight of the components utilized to form the binding agent prior to reaction.

15. A lignocellulosic article as set forth in claim 12 wherein said plurality of lignocellulosic pieces are present in said lignocellulosic article in an amount of from about 75 to about 99 parts by weight based on 100 parts by weight of said lignocellulosic article.

16. A lignocellulosic article as set forth in claim 12 wherein said isocyanate component comprises polymethylene polyphenylpolyisocyanate (pMDI).

17. A lignocellulosic article as set forth in claim 12 having an internal bond (IB) strength of at least 40 psi, as measured in accordance with ASTM D1037.

18. A lignocellulosic article as set forth in claim 12 wherein X is selected from an ethyl hexyl group, a hydroxyethyl group, a stearyl group, a 2-hydroxypropyl group, and combinations thereof.

19. A method as set forth in claim 1 wherein X is selected from an ethyl hexyl group, a hydroxyethyl group, a 2-hydroxypropyl group, and combinations thereof.

20. A lignocellulosic article as set forth in claim 12, wherein X is selected from an ethyl hexyl group, a hydroxyethyl group, a 2-hydroxypropyl group, and combinations thereof.

* * * * *